US012802463B2

(12) United States Patent
Kameyama

(10) Patent No.: US 12,802,463 B2
(45) Date of Patent: Nov. 17, 2026

(54) VEHICLE CONTROL DEVICE

(71) Applicant: TOYOTA JIDOSHA KABUSHIKI KAISHA, Toyota (JP)

(72) Inventor: Masaaki Kameyama, Yokohama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 27 days.

(21) Appl. No.: 19/055,910

(22) Filed: Feb. 18, 2025

(65) Prior Publication Data

US 2025/0308257 A1 Oct. 2, 2025

(30) Foreign Application Priority Data

Apr. 1, 2024 (JP) ................................. 2024-058828

(51) Int. Cl.
*B60W 30/12* (2020.01)
*G06V 20/56* (2022.01)

(52) U.S. Cl.
CPC ........... *G06V 20/588* (2022.01); *B60W 30/12* (2013.01); *B60W 2420/403* (2013.01); *B60W 2552/53* (2020.02); *B60W 2556/40* (2020.02)

(58) Field of Classification Search
None
See application file for complete search history.

(56) References Cited

U.S. PATENT DOCUMENTS

2002/0081001 A1* 6/2002 Tsuji .................... G06V 20/588 382/104
2018/0082414 A1* 3/2018 Rozenberg ................ G06T 7/75
2021/0063162 A1* 3/2021 Moskowitz ............ G01C 21/28
2021/0101616 A1* 4/2021 Hayat .................... G01C 21/32
2022/0198200 A1* 6/2022 LaPonse .............. G06V 20/588
2023/0117719 A1* 4/2023 Ma ............................ B60R 1/12 348/148
2024/0132032 A1* 4/2024 Matsumoto ............... B60T 7/22

FOREIGN PATENT DOCUMENTS

JP 2008-298622 A 12/2008
JP 2012-215442 A 11/2012
JP 2016-038757 A 3/2016
JP 2019-220037 A 12/2019
JP 2021-068052 A 4/2021
WO 2008/146951 A1 12/2008

* cited by examiner

*Primary Examiner* — James M Mcpherson
(74) *Attorney, Agent, or Firm* — Oliff PLC

(57) ABSTRACT

A vehicle control device includes a memory configured to store structure information indicating a position and a type of a structural object visible from a vehicle traveling in a predetermined road section, and similar relationship information indicating a similar relationship between the structural object and one or more predetermined features which are provided in the predetermined road section; and a processor configured to detect the one or more predetermined features based on an image generated by a camera mounted on the vehicle and representing a situation around the vehicle, determine whether or not the structural object has been erroneously recognized as at least one of the one or more predetermined features detected while the vehicle is traveling in the predetermined road section based on the similar relationship information and the structure information, and control the traveling of the vehicle according to the determination result.

2 Claims, 5 Drawing Sheets

VEHICLE CONTROL DEVICE

FIELD

The present invention relates to a vehicle control device.

BACKGROUND

A technique of recognizing a predetermined feature existing around a vehicle using an image generated by a camera mounted on the vehicle in order to identify the self-position of the vehicle has been proposed (see Japanese Unexamined Patent Publication JP2012-215442A).

The self-localization system disclosed in JP2012-215442A determines whether or not there is a possibility of false recognition, which is a possibility that a feature whose presence is known in advance is recognized from an image as an object feature, the recognized feature being different from the object feature when the image recognition of the object feature succeeds. When it is determined that there is a possibility of false recognition, the self-localization system omits to correct the estimated self-localization information based on the image recognition result of the target feature and the target feature information.

SUMMARY

A road may be provided with a structural object similar to some feature that represents information about the travel of a vehicle (e.g., a snow melting pipe similar to a lane division line). In a case where a vehicle that is applied to autonomous driving control is traveling in a road section provided with such a structural object, a vehicle control system may erroneously recognize the structural object as a similar feature in an image obtained by a camera mounted on the vehicle, and as a result, inappropriate vehicle control may be executed.

It is an object of the present invention to provide a vehicle control device that can prevent an inappropriate vehicle control from being executed due to erroneously recognizing a structural object provided on a road as a predetermined feature.

A vehicle control device, which is provided by one embodiment, includes: a memory configured to store structure information indicating a position and type of a structural object visible from a vehicle traveling in a predetermined road section, feature information indicating a position and number of one or more predetermined features which are provided in the predetermined road section and represent information relating to a traveling of the vehicle or affects the traveling of the vehicle, and similar relationship information indicating a similar relationship between the one or more predetermined features and the structural object; and a processor configured to detect the one or more predetermined features based on an image which is generated by a camera mounted on the vehicle and represents a situation around the vehicle, determine whether or not the structural object has been erroneously recognized as at least one of the one or more predetermined features detected while the vehicle is traveling in the predetermined road section, based on the structure information, the feature information and the similarity relationship information, and control the traveling of the vehicle according to whether or not the structural object has been erroneously recognized as the at least one of the one or more detected predetermined features.

In one embodiment, the processor determines that the structural object has been erroneously recognized as the at least one of the one or more detected predetermined features when a number of the predetermined features detected in the predetermined road section is larger than a number of the predetermined features represented in the feature information, or when a position of any of the detected predetermined features is closer to the position of the structural object which is similar to the one or more predetermined features indicated in the similar relationship information than a position of a corresponding feature indicated in the feature information, the position of the structural object being indicated in the structure information.

In one embodiment, the structural object is a snow melting pipe, and the one or more predetermined features are a lane division line. The memory further stores map information representing a positional relationship between the snow melting pipe and the lane division line, and the processor controls the traveling of the vehicle so as to maintain a predetermined positional relationship with respect to the lane division line based on the positional relationship between the snow melting pipe and the lane division line represented in the map information and the relative position of the snow melting pipe erroneously recognized as the lane division line with respect to the vehicle, when the snow melting pipe has been erroneously recognized as any of the one or more predetermined features detected in the predetermined road section.

In one embodiment, the structural object is a vehicle guide line and the one or more predetermined features are a lane division line, and the processor controls the traveling of the vehicle so that the vehicle travels while straddling the vehicle guide line erroneously recognized as the lane division line, when the vehicle guide line has been erroneously recognized as any of the one or more predetermined features detected in the predetermined road section.

In one embodiment, the structural object is a pattern which imitates a three-dimensional structural object provided on a road surface, and the one or more predetermined features are the three-dimensional structural object, and the processor controls the traveling of the vehicle so as not to stop in the vicinity of the pattern erroneously recognized as the three-dimensional structural object, when the pattern has been erroneously recognized as any of the one or more predetermined features detected in the predetermined road section.

The vehicle control device according to the present disclosure has an advantageous effect of being able to prevent inappropriate vehicle control from being executed due to erroneously recognizing a structural object provided on a road as a predetermined feature.

DESCRIPTION OF EMBODIMENTS

Hereinafter, a vehicle control device, a vehicle control method executed on the vehicle control device, and a computer program for vehicle control will be described with reference to the drawings. The vehicle control device uses information regarding a predetermined feature detected from an image which represents a situation around a vehicle and is generated by a camera mounted on the vehicle for autonomous driving control of the vehicle or driving assistance of a driver of the vehicle. At this time, the vehicle control device refers to feature information regarding the predetermined feature, similarity relationship information indicating the similar relationship between the predetermined feature and a structural object that can be visually recognized from the vehicle traveling in a predetermined road section, and structure information indicating the position and the type of the structural object, to determine whether or not the structural object has been erroneously recognized as the predetermined feature while the vehicle is traveling in the road section. The vehicle control device controls the traveling of the vehicle according to the determination result, thereby preventing the inappropriate control of the vehicle due to the erroneous recognition.

Figure 1:
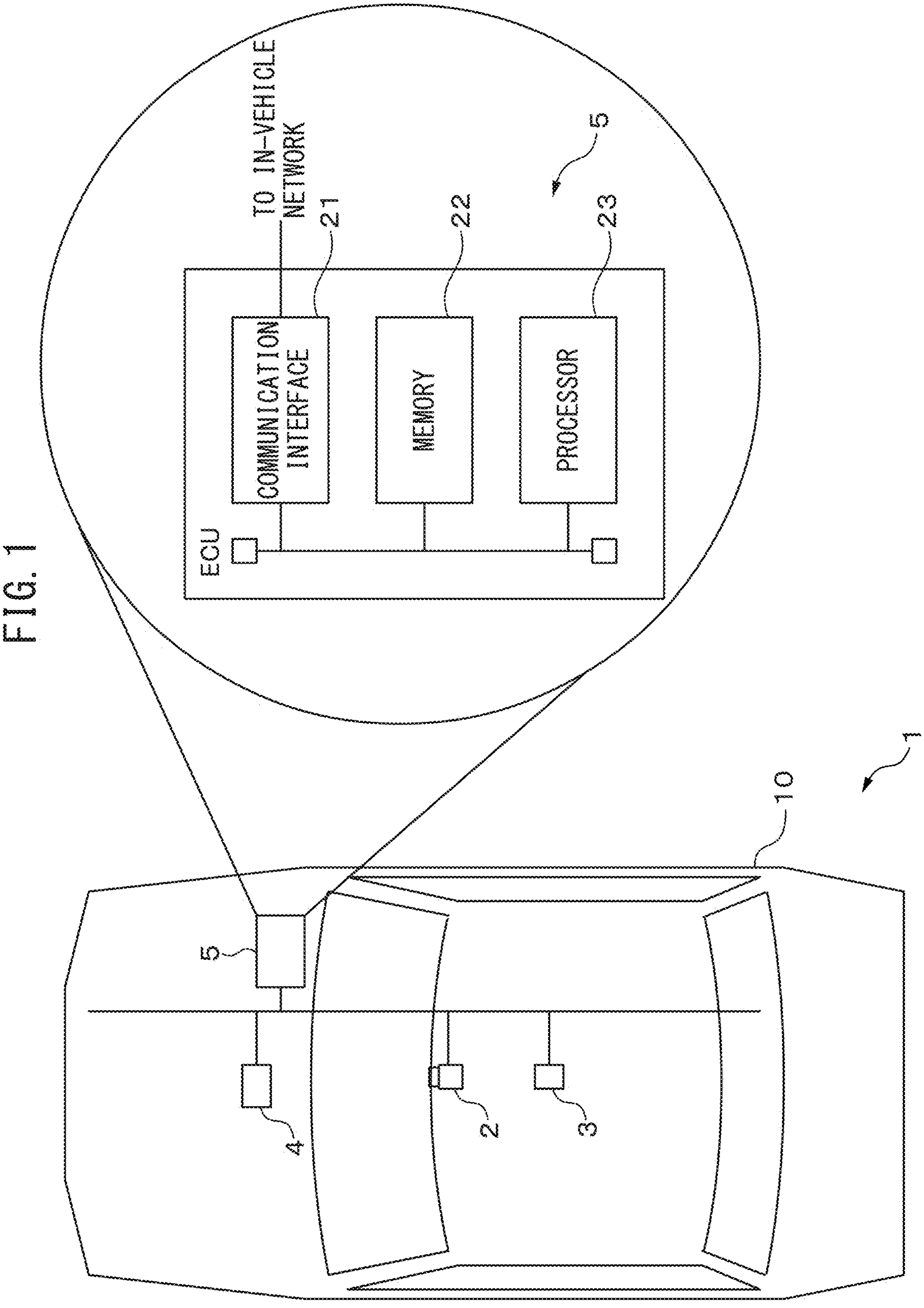
FIG. 1 schematically illustrates the configuration of a vehicle control system equipped with a vehicle control device.

FIG. 1 schematically illustrates the configuration of a vehicle control system equipped with a vehicle control device. In the present embodiment, the vehicle control system 1 mounted on the vehicle 10 and controlling the vehicle 10 includes a camera 2, a GPS receiver 3, a storage device 4, and an electronic control device (ECU) 5 that is an example of a vehicle control device. The camera 2, the GPS receiver 3, and the storage device 4 are communicably connected to the ECU 5 via an in-vehicle network. The vehicle control device 1 may further include a range sensor (not shown) that measures a distance to an object existing around the vehicle 10, such as a LiDAR or a radar. The vehicle control system 1 may further include a wireless communication terminal (not shown) for wirelessly communicating with an external device of the vehicle 10.

The camera 2 is an example of a sensor that generates a sensor signal representing a situation around the vehicle 10, and is mounted on the vehicle 10 so as to be oriented toward a predetermined region (for example, a front region of the vehicle 10) including a road surface around the vehicle 10 such that the predetermined region is included in an imaging range of the camera 2. Then, the camera 2 takes pictures of the predetermined region, every predetermined capturing period (for example, 1/30 second to 1/10 second), and generates images representing the predetermined region. The vehicle 10 may be provided with a plurality of cameras taking pictures in different orientations or having different focal lengths.

Each time an image is generated, the camera 2 outputs the generated image to the ECU 5 via the in-vehicle network.

The GPS receiver 3 receives GPS signals from GPS satellites at predetermined intervals, and determines the position of the vehicles 10 based on the received GPS signals. Then, the GPS receiver 3 outputs, to the ECU5 via the in-vehicle network, the positioning information indicating the result of determination of the position of the vehicle 10 based on the GPS signals at predetermined intervals. Instead of the GPS receiver 3, the vehicle 10 may include a receiver that receives positioning signals from satellites of another satellite positioning system to determine the position of the vehicle 10.

The storage device 4 is an example of a storage unit, and includes, for example, a hard disk device, a nonvolatile semiconductor memory, or an optical recording medium and an access device thereof. Then, the storage device 4 stores map information. The map information includes feature information indicating a number of one or more predetermined features and a position and a type of each of predetermined features, each of predetermined features provided in each of the road sections included in the predetermined area represented in the map information. The predetermined feature represents information related to the travel of the vehicle 10 or affects the travel of the vehicle 10. The predetermined feature includes a road marking, such as lane division line or stop line, a road sign such as a stop sign, traffic lights, and three-dimensional structural objects, such as blocks or cones, provided on a road to restrict vehicle entry or decelerate a vehicle. The map information further includes, for each road section, structure information indicating a position and a type of a structural object that can be visually recognized from the vehicle 10 traveling in the road section, and similar relationship information indicating a similar relationship between the structural object and the predetermined feature. The structural object includes a snow melting pipe, a vehicle guide line, a pattern imitating the three-dimensional structural object, and a signboard. Further, the structural object may include a structural object similar to the predetermined feature only for a certain period, such as the moon. With respect to such a structural object, the structure information may include information indicating an azimuth or a position as viewed from a predetermined road section for each date and time. In addition, the similarity relationship information associates, for each type of structural object, a type of feature having an appearance similar to the appearance of the structural object on the image with the structural object, and for example, the type of structural object and the type of feature having a similar relationship are represented in a list format. As a specific example, the similarity relationship information indicates that the snow melting pipe, which is an example of the structural object, is similar to the lane division line, which is an example of the feature. In addition, the similarity relationship information indicates that the vehicle guide line, which is another example of the structural object, is similar to the lane division line. Further, the similarity relationship information indicates that a certain type of signboard, which is still another example of the structural object, is similar to a predetermined road sign, which is another example of the feature. Further, the similarity relationship information indicates that a pattern of a three-dimensional structural object drawn on a road surface, which is still another example of the structural object, is similar to the three-dimensional structural object, which is still another example of the feature. Furthermore, the similarity relationship information indicates that the moon, which is still another example of the structural object, is similar to the traffic light, which is still another example of the feature. Further, the map information may further include information on facilities provided on the road, such as the presence or absence of lane division lines, the number of lanes, and the individual lane widths in the individual road sections and tollbooths. Further, the map information includes information representing a positional relationship between the predetermined feature indicated in the feature information and the structural object similar to the predetermined feature indicated in the structure information (for example, a position of the predetermined feature and a position of the structural object or an azimuth and relative distance from the predetermined feature to the structural object). Furthermore, the map information may include information indicating a position and a range of a section in which the snow melting pipe is provided.

Further, the storage device 4 may include a processor for executing a process related to a map information update process and a map information read request. Each time the vehicle 10 moves by a predetermined distance, the storage device 4 may transmit a request for acquiring map information to a map server (not shown) via the wireless communication terminal together with the current position of the vehicle 10. Then, the storage device 4 may receive map information about a predetermined region around the current position of the vehicle 10 from the map server via the wireless communication terminal. In addition, upon receiving a request to read the map information from the ECU 5, the storage device 4 cuts out a range that includes the current position of the vehicle 10 and is relatively narrower than the predetermined region from the stored map information, and outputs the map information of the range to the ECU 5 via the in-vehicle network.

The ECU 5 executes a vehicle control process for the vehicle 10.

The ECU 5 includes a communication interface 21, a memory 22, and a processor 23. The communication interface 21, the memory 22, and the processor 23 may each be configured as separate circuits or may be integrally configured as a single integrated circuit.

The communication interface 21 includes an interface circuit for connecting the ECU 5 to the in-vehicle network. The communication interface 21 passes the image received from the camera 2, the positioning information received from GPS receiver 3, and the map information read from the storage device 4 to the processor 23.

The memory 22, which is another example of a storage unit, includes, for example, a volatile semiconductor memory and a non-volatile semiconductor memory. The memory 22 stores various types of data used in the vehicle control process executed by the processor 23. For example, the memory 22 stores parameters of the camera 2 such as a focal length, an imaging direction, and an attachment position, and various parameters for specifying a classifier for object detection used to detect some feature. The memory 22 also stores positioning information of the vehicle 10, images around the vehicle 10, and map information. Furthermore, the memory 22 temporarily stores various types of data generated during the vehicle control process.

The processor 23 includes one or more central processing units (CPUs) and a peripheral circuit thereof. The processor 23 may further include another operating circuit such as a logic-arithmetic unit, an arithmetic unit, or a graphics processing unit. Then, the processor 23 executes the vehicle control process on the vehicle 10 at predetermined intervals.

Figure 2:
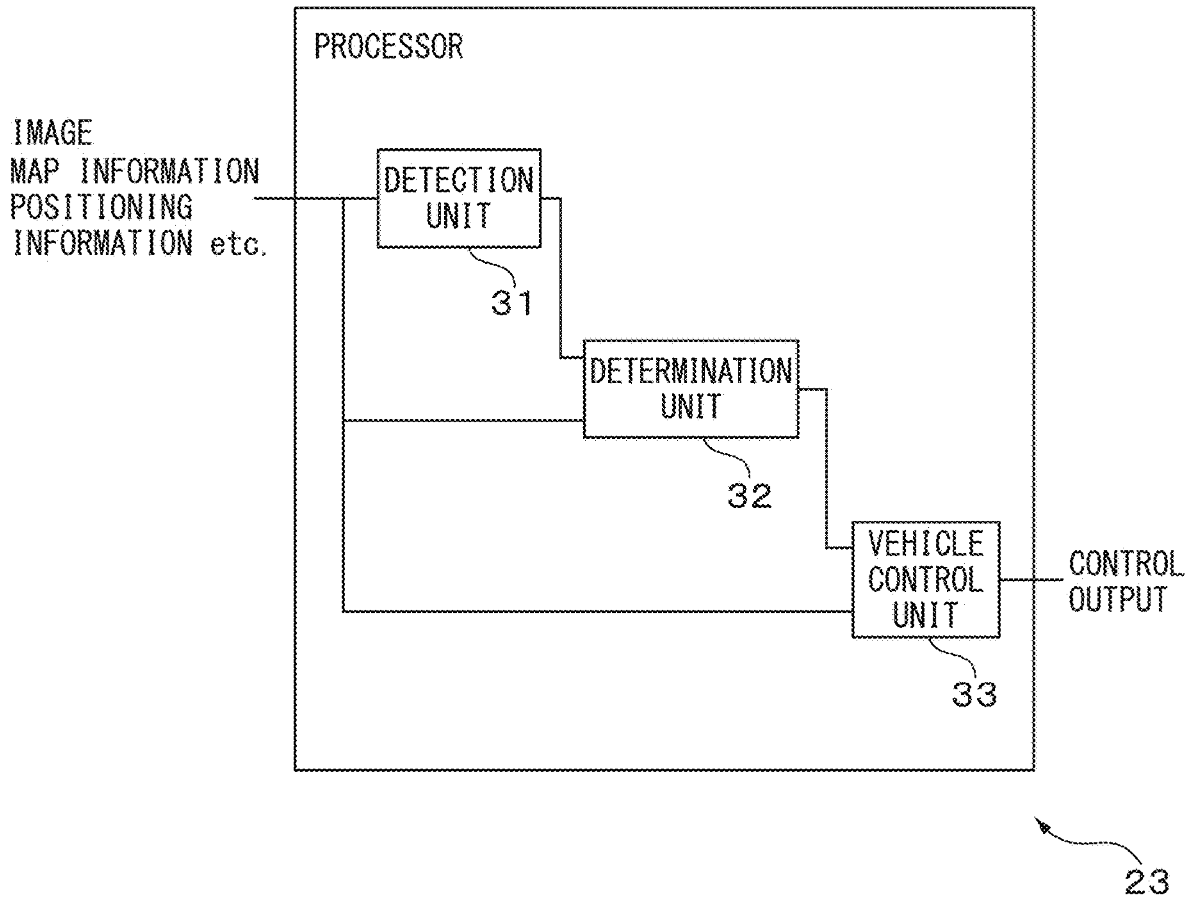
FIG. 2 is a functional block diagram of a processor of an electronic control unit, which is an embodiment of a vehicle control device.

FIG. 2 is a functional block diagram of the processor 23 related to the vehicle control process. The processor 23 includes a detection unit 31, a determination unit 32, and a vehicle control unit 33. Each of these units included in the processor 23 is a functional module, for example, implemented by a computer program executed by the processor 23. Alternatively, each of these units included in the processor 23 may be a dedicated operating circuit provided in the processor 23.

The detection unit 31 detects a predetermined feature based on an image generated by the camera 2 and representing a situation around the vehicle 10. To this end, the detection unit 31 detects a predetermined feature represented in an image by inputting the image to a classifier trained in advance so as to detect the predetermined feature. The classifier is configured by, for example, a convolutional neural network (CNN) for detecting objects, such as Single Shot MultiBox Detector or Faster R-CNN, or a CNN for semantic segmentation, such as U-Net. Alternatively, the discriminator may be comprised of a deep neural network (DNN) with attention mechanisms, such as Vision Transformer. Alternatively, the classifier may be a classifier based on a mechanical-learning technique other than DNN, such as a support vector machine. The classifier is trained in advance according to a predetermined learning method such as Backpropagation using a large number of teacher images including an image in which any type of feature to be detected is represented.

The detection unit 31 determines that, for any type of feature, the type of feature is represented in a region in which a confidence score indicating the likelihood that the type of feature is represented is equal to or greater than a predetermined detection threshold value, the confidence score being calculated by the classifier. The region in which the detected feature is represented is hereinafter referred to as an object region. When a feature is detected from the image, the detection unit 31 notifies the determination unit 32 and the vehicle control unit 33 of the type of the detected feature and the object region in which the feature is represented. Further, when the feature is detected, the detection unit 31 notifies the determination unit 32 of the position of the vehicle 10 indicated by the positioning information generated at the time closest to the generation time of the image in which the feature is detected, as the position of the vehicle 10.

The determination unit 32 determines whether or not the structural object has been erroneously recognized as the detected feature based on the feature information, the structure information, and the similarity relationship information included in the map information.

The determination unit 32 refers to the position of the vehicle 10 when the feature is detected and the map information, and identifies the road section in which the vehicle 10 is traveling when the feature is detected. Then, the determination unit 32 refers to each of the structure information and the similarity relationship information, and determines whether or not there is a structural object similar to the detected feature in the road section. When there is no structural object similar to the feature detected in the road section, the determination unit 32 determines that the feature is correctly detected. On the other hand, when there is a structural object similar to the detected feature in the road section, the determination unit 32 determines whether or not the structural object has been erroneously recognized as the feature in accordance with the type of the detected feature.

When the detected feature is a lane division line, and a snow melting pipe, which is an example of a structural object similar to the lane division line, is provided in the road section in which the vehicle 10 is traveling, the determination unit 32 refers to the feature information included in the map information to determine whether or not the lane division line is provided in the road section. For example, when the feature information indicates that the road section in which the vehicle 10 is traveling is a section in which there is no lane division line, the determination unit 32 determines that the snow melting pipe has been erroneously recognized as the detected lane division line.

When the number of detected lane division lines is larger than the number of lane division lines indicated in the feature information for the road section in which the vehicle 10 is traveling, the determination unit 32 determines that the snow melting pipe has been erroneously recognized as any one of the detected lane division lines.

In this case, the determination unit 32 may estimate the accurate position of the vehicle 10 by matching the image with the map information, and may estimate the position of each detected lane division line based on the estimation result of the position of the vehicle 10. Then, the determination unit 32 may determine that the snow melting pipe has been erroneously recognized as the lane division line that is closer to the snow melting pipe than any other lane division lines represented in the feature information included in the map information among the detected lane division lines.

The determination unit 32 projects each of the one or more features detected from the image onto the map information by using parameters of the camera 2 such as an attachment position, an imaging direction, and a focal length, and assuming the position and the traveling direction of the vehicle 10. It is preferable that the projected feature is a feature other than the lane division line. Then, the determination unit 32 calculates the sum of the amount of positional deviation between each of the detected features and each of the corresponding features represented in the feature information. The determination unit 32 may repeat the above-described processing while variously changing the assumed position and traveling direction of the vehicle 10, and estimate the position and the traveling direction of the vehicle 10 when the total of the positional deviation amounts becomes minimum as the actual position and the traveling direction of the vehicle 10.

In addition, in a case where the number of detected lane division lines is equal to or less than the number of lane division lines indicated in the feature information, the determination unit 32 may estimate the positions of the individual lane division lines in the same manner as described above. When the estimated position for any lane division line is closer to the snow melting pipe than any lane division line represented in the feature information, the determination unit 32 may determine that the snow melting pipe has been erroneously recognized as the detected lane division line. When the estimated position of all the detected lane division lines is closer to any lane division line than the snow melting pipe represented in the structure information, the determination unit 32 determines that the detection result is correct for all the lane division lines.

Since the snow melting pipe is provided on the road surface and the parameters of the camera 2 such as the attachment position are known, when the snow melting pipe has been erroneously recognized as any of the detected lane division lines, the determination unit 32 can estimate the position of the snow melting pipe with respect to the camera 2 reference on the position of the erroneously recognized lane division line on the image, that is, the position of the snow melting pipe.

When the detected feature is a lane division line and the vehicle guide line, which is another example of a structural object similar to the lane division line, is provided in the road section in which the vehicle 10 is traveling, the determination unit 32 can determine whether or not the vehicle guide line has been erroneously recognized as the detected lane division line, by executing a process similar to the process above described. Furthermore, the determination unit 32 can estimate the position of the vehicle guide line with respect to the camera 2 reference on the position of the vehicle guide line on the image.

Further, when the detected feature is a predetermined road sign, and a signboard, which is an example of a structural object similar to the road sign, is provided in the road section in which the vehicle 10 is traveling, at a position visible from the vehicle 10 in the road section, the determination unit 32 estimates the position of the detected road sign by executing the above-described process of matching the image with the map information. When the estimated position of the detected road sign is closer to the signboard than the corresponding road sign represented in the feature information, the determination unit 32 determines that the signboard has been erroneously recognized as the detected road sign. In addition, even when the detected road sign is not indicated in the feature information in the road section in which the vehicle 10 is traveling, the determination unit 32 may determine that the signboard has been erroneously recognized as the detected road sign. On the other hand, when the estimated position of the detected road sign is closer to the corresponding road sign than the sign represented in the structure information, the determination unit 32 determines that the detection result of the road sign is correct.

Furthermore, when the detected feature is a three-dimensional structural object provided on the road surface and a pattern on the road surface, which is an example of a structural object similar to the three-dimensional structural object, is provided in the road section in which the vehicle 10 is traveling, the determination unit 32 estimates the position of the detected three-dimensional structural object by executing the above-described process of matching the image with the map information. When the estimated position of the three-dimensional structural object is closer to the pattern than the corresponding three-dimensional structural object, the determination unit 32 determines that the pattern has been erroneously recognized as the detected three-dimensional structural object. Then, the determination unit 32 can estimate the position of the pattern with respect to the camera 2 based on the position of the pattern on the image. Further, even in a case where the three-dimensional structural object is not indicated in the feature information in the road section in which the vehicle 10 is traveling, the determination unit 32 may determine that the pattern has been erroneously recognized as the detected three-dimensional structural object. On the other hand, when the estimated position of the detected three-dimensional structural object is closer to the corresponding three-dimensional structural object than the pattern represented in the structure information, the determination unit 32 determines that the detection result of the three-dimensional structural object is correct.

Furthermore, when the detected feature is a traffic light and the moon, which is an example of a structural object similar to the traffic light, is visible from the road section in which the vehicle 10 is traveling at the time and date when the traffic light is detected, the determination unit 32 obtains the direction from the vehicle 10 to the traffic light detected based on the position of the object region in which the traffic light is represented on the image. Further, the determination unit 32 obtains the direction from the vehicle 10 to the traffic light actually installed on the basis of the position and the traveling direction of the vehicle 10 and the position of the traffic light installed in the road section represented by the feature information. When the difference between the direction toward the detected traffic light and the direction toward the moon at the time of detection indicated in the structure information is smaller than the difference between the direction toward the detected traffic light and the direction toward the actually installed traffic light, the determination unit 32 determines that the moon has been erroneously recognized as the detected traffic light. Further, even in a case where no traffic light is indicated in the feature information in the road section in which the vehicle 10 is traveling, the determination unit 32 may determine that the moon has been erroneously recognized as the detected traffic light. Conversely, when the difference between the direction toward the detected traffic light and the direction toward the actually installed traffic light is smaller than the difference between the direction toward the detected traffic light and the direction toward the moon at the time of detection indicated in the structure information, the determination unit 32 determines that the detection result for the traffic light is correct.

Figure 3:
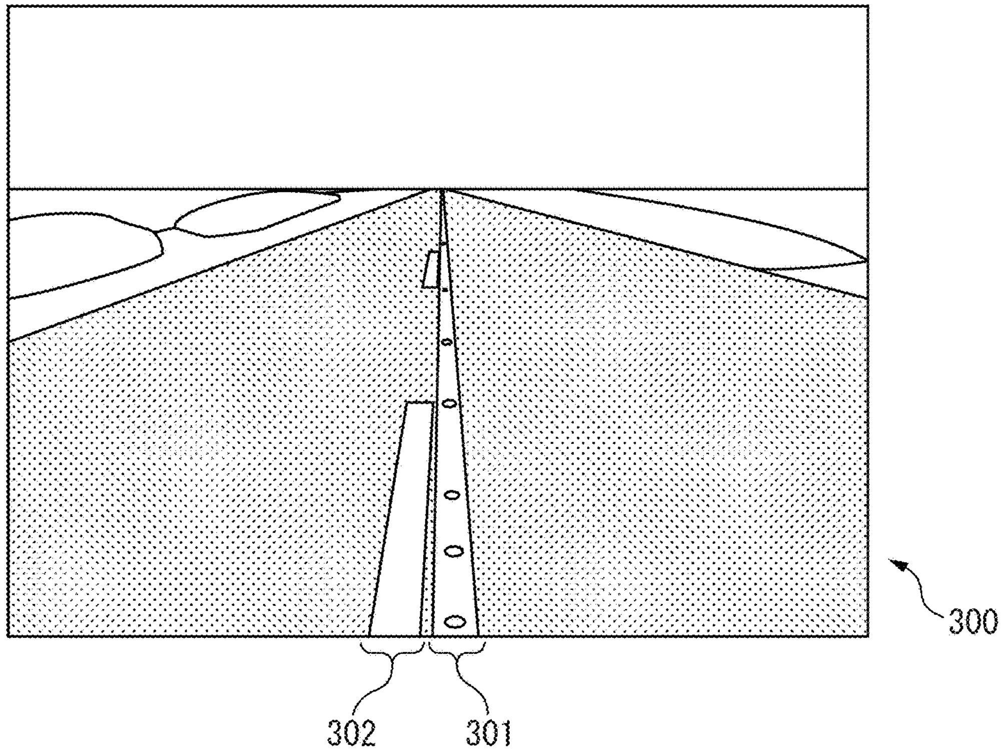
FIG. 3 is a diagram illustrating an example of a detected feature and a structural object similar to the feature.

FIG. 3 is a diagram illustrating an example of a detected feature and a structural object similar to the feature. In the example shown in FIG. 3, the snow melting pipe 301 is represented in the image 300 generated by the camera 2. Since the snow melting pipe 301 is similar to the lane division line, it may be erroneously detected as the lane division line. Since the position of the snow melting pipe 301 is different from the actual position of the lane division line 302, if the traveling of the vehicle 10 is controlled while the snow melting pipe 301 is erroneously recognized as the lane division line, the position of the vehicle 10 in the lane may become an inappropriate position.

Figure 4:
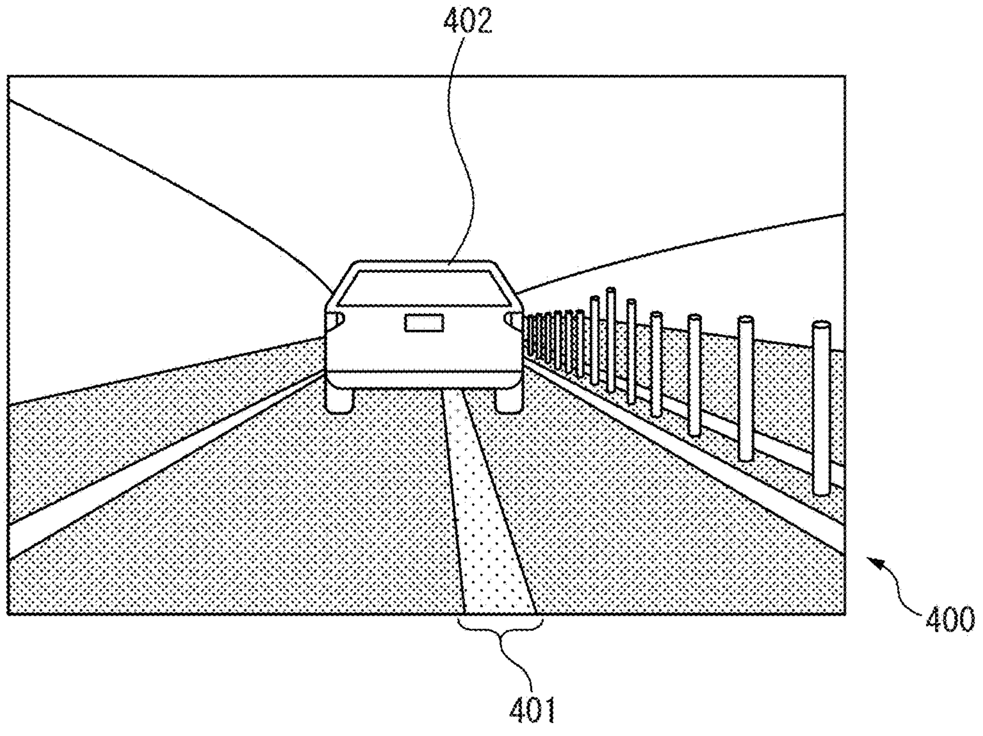
FIG. 4 is a diagram illustrating another example of a detected feature and a structural object similar to the feature.

FIG. 4 is a diagram illustrating another example of a detected feature and a structural object similar to the feature. In the example shown in FIG. 4, the vehicle guide line 401 is represented in the image 400 generated by the camera 2. Since the vehicle guide line 401 is similar to the lane division line, the vehicle guide line 401 may be erroneously detected as the lane division line. The vehicle guide line 401 is provided not at the position of the boundary of the lane, but at a position where the vehicle traveling in the lane straddles, such as the vehicle 402 represented in the image 400. Therefore, if the traveling of the vehicle 10 is controlled while the vehicle guide line 401 is erroneously recognized as the lane division line, there is a possibility that the position of the vehicle 10 in the lane becomes an inappropriate position.

Figure 5:
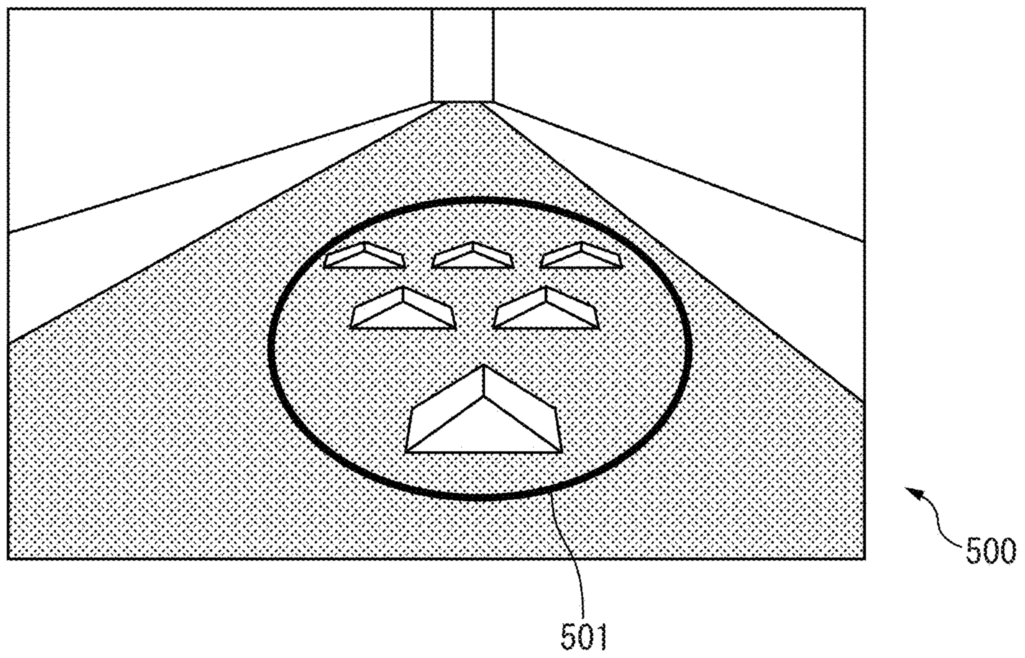
FIG. 5 is a diagram illustrating another example of a detected feature and a structural object similar to the feature.

FIG. 5 is a diagram illustrating still another example of a detected feature and a structural object similar to the feature. In the example illustrated in FIG. 5, the image 500 generated by the camera 2 represents a pattern 501 on a road surface that imitates a three-dimensional structural object. Since the pattern 501 is similar to the three-dimensional structural object to be imitated, the pattern 501 may be erroneously detected as the three-dimensional structural object. In this example, the pattern 501 is provided in an area through which the vehicle passes on the road surface, and therefore, if the traveling of the vehicle 10 is controlled while the pattern 501 is erroneously recognized as the three-dimensional structural object, the vehicle 10 may be stopped even though the vehicle 10 does not need to stop.

The determination unit 32 notifies the vehicle control unit 33 of the determination result as to whether or not the detected feature is erroneously recognized. Furthermore, the determination unit 32 notifies the vehicle control unit 33 of the estimated position of the vehicle 10 and the position of the structural object misrecognized as any feature with respect to the camera 2.

The vehicle control unit 33 controls the traveling of the vehicle 10 in accordance with the detected predetermined feature and the determination result of whether or not any structural object has been erroneously recognized as the feature.

For example, when the snow melting pipe has been erroneously recognized as the detected lane division line, the vehicle control unit 33 can estimate the distance from the actual lane division line to the vehicle 10 based on the positional relationship between the snow melting pipe and the actual lane division line represented in the map information and the relative position of the snow melting pipe with respect to the vehicle 10 with reference to the installation position of the camera 2. Then, the vehicle control unit 33 controls the traveling of the vehicle 10 so as to maintain a predetermined positional relationship with respect to the actual lane division line on the basis of the estimated distance from the actual lane division line to the vehicle 10. For example, the vehicle control unit 33 controls the steering of the vehicle 10 so that the vehicle 10 travels along the center of the lane. Alternatively, when the estimated distance from the actual lane division line to the vehicle 10 is less than a predetermined offset distance, the vehicle control unit 33 executes the lane departure prevention control. That is, the vehicle control unit 33 may control the steering so that the estimated distance becomes equal to or greater than the offset distance, or may notify the driver of the warning of the lane departure via a notification device (not shown) provided in the vehicle interior of the vehicle 10.

In addition, when the vehicle guide line has been erroneously recognized as the detected lane division line, the vehicle control unit 33 controls each unit of the vehicle 10 so that the vehicle 10 travels while straddling the vehicle guide line on the basis of the estimated position of the vehicle guide line with respect to the camera 2 and the installation position of the camera 2 in the vehicle 10. Further, even if the distance from the vehicle guide line misrecognized as the lane division line to the vehicle 10 is less than the predetermined offset distance, the vehicle control unit 33 does not execute the lane departure prevention control. Furthermore, when the vehicle control unit 33 detects that the vehicle 10 has entered the road section in which the vehicle guide line is provided by referring to the map information and the position of the vehicle 10 indicated by the positioning information, the vehicle control unit 33 may guide via the notification device the driver to set the route of the vehicle 10 so that the vehicle 10 straddles the vehicle guide line.

Further, when the pattern of the road surface has been erroneously recognized as the detected three-dimensional structural object, the vehicle control unit 33 controls the powertrain and the brake of the vehicle 10 so as to maintain the current speed of the vehicle 10. However, the pattern on the road surface itself may be provided to encourage the driver to slow down. Therefore, the vehicle control unit 33 may control the powertrain and braking of the vehicle 10 so as to decelerate the vehicle 10 to a predetermined velocity (for example, 20 km/h~30 km/h) without stopping the vehicle in the vicinity of the pattern. Alternatively, when the vehicle control unit 33 detects that the vehicle has entered the road section in which the pattern of the road surface is provided by referring to the map information and the position of the vehicle 10 indicated by the positioning information, the vehicle control unit 33 may notify via the notification device the driver to decelerate the vehicle 10 to a predetermined speed.

Furthermore, in a case where the signboard has been erroneously recognized as the detected road sign, the vehicle control unit 33 controls each unit of the vehicle 10 so as to ignore the instruction of the detected road sign and maintain the current traveling state of the vehicle 10. For example, when the signboard has been erroneously recognized as the pause sign, the vehicle control unit 33 controls the powertrain and the brake of the vehicle 10 so as to maintain the current speed without stopping the vehicle 10. Similarly, when the moon has been erroneously recognized as the detected traffic light, the vehicle control unit 33 controls each unit of the vehicle 10 so as to ignore the detected traffic light and maintain the current traveling state of the vehicle 10.

When a predetermined feature is correctly detected, the vehicle control unit 33 controls the traveling of the vehicle 10 in accordance with the detected feature. For example, when the lane division line is correctly detected, the vehicle control unit 33 may control each unit of the vehicle 10 so as to travel in the center of the lane in which the vehicle 10 is traveling on the basis of the detected lane division line, or may execute the lane departure prevention control. In addition, when the road sign is correctly detected, the vehicle control unit 33 may control each unit of the vehicle 10 so as to follow the detected instruction of the road sign.

Figure 6:
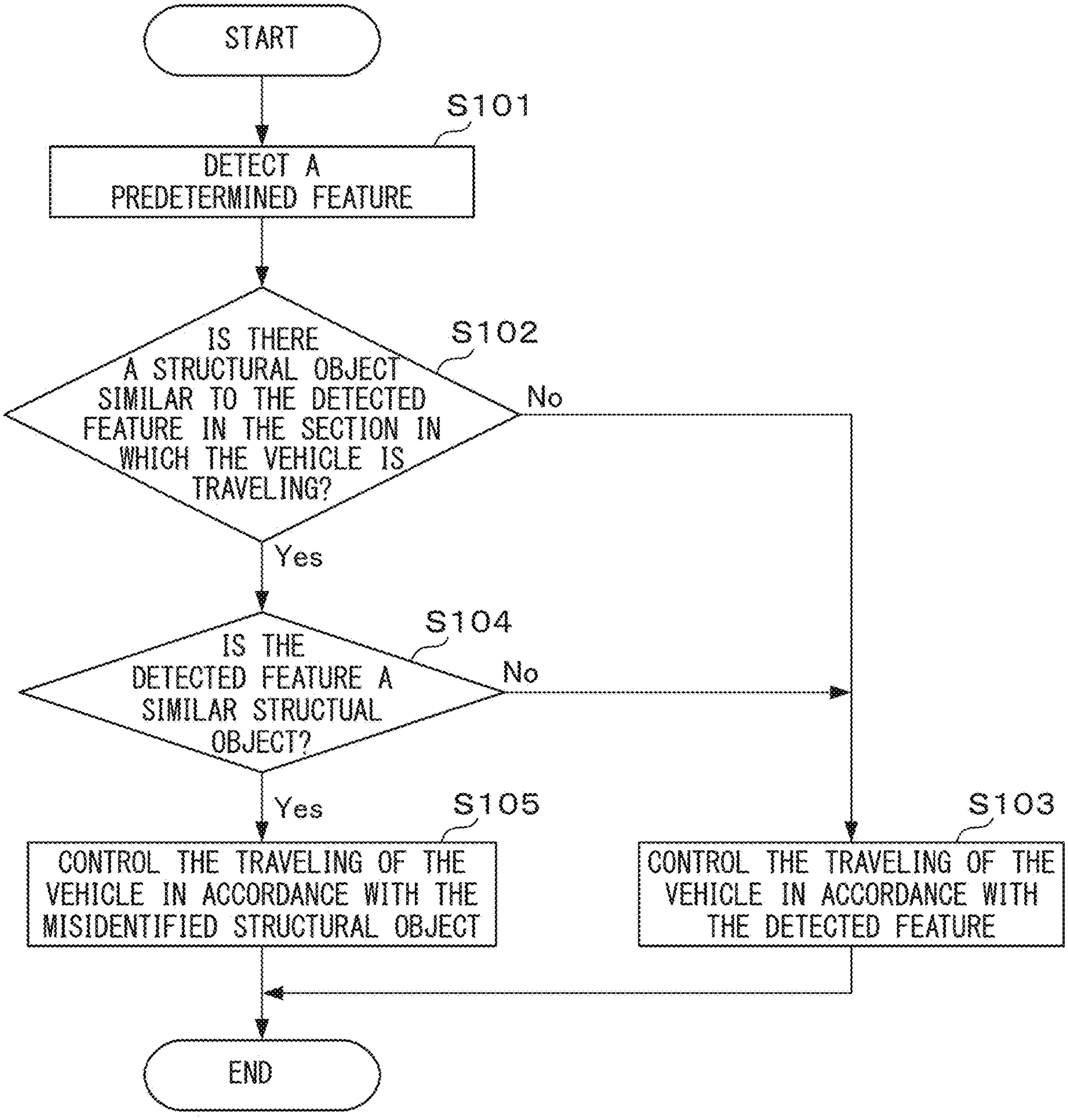
FIG. 6 is an operation flowchart of the vehicle control process.

FIG. 6 is an operation flowchart of the vehicle control process. The processor 23 may execute the vehicle control process according to the following operation flowchart.

The detection unit 31 detects a predetermined feature from an image generated by the cameras 2 (step S101). The determination unit 32 determines whether or not there is a structural object similar to the detected feature in the section in which the vehicle 10 is traveling (step S102). When the section in which the vehicle 10 is traveling is a section without a structural object similar to the detected feature (No in step S102), the vehicle control unit 33 controls the traveling of the vehicle 10 in accordance with the detected feature (step S103).

On the other hand, when the section in which the vehicle 10 is traveling is a section having a structural object similar to the detected feature (Yes in step S102), the determination unit 32 determines whether or not the detected feature is a structural object similar to the detected feature (step S104). When the detected feature is not the similar structural object, that is, when the detection result of the feature is correct (No in step S104), the vehicle control unit 33 controls the travel of the vehicle 10 in accordance with the detected feature (step S103).

On the other hand, when the similar structural object has been erroneously recognized as the detected feature (Yes in step S104), the vehicle control unit 33 controls the traveling of the vehicle 10 in accordance with the misrecognized structural object (step S105). After step S103 or step S105, the processor 23 ends the vehicle control process.

As described above, when a predetermined feature is detected while a vehicle is traveling in a road section in which a structural object similar to the predetermined feature is provided, the vehicle control device determines whether or not the structural object has been erroneously recognized as the predetermined feature. The vehicle control device controls the traveling of the vehicle in accordance with whether or not the structural object has been erroneously recognized as the detected predetermined feature, thereby preventing inappropriate control of the vehicle due to erroneous recognition of the feature.

In a road section in which a snow melting pipe is provided (hereinafter, referred to as a snow melting pipe section), since the road surface is wet, the vehicle is likely to slip. In addition, although the snow accumulation on the road surface is eliminated in the snow melting pipe section, snow accumulation may remain on the road surface, or the road surface may be ice road in a section other than the snow melting pipe section.

Therefore, according to the modified example, the vehicle control unit 33 refers to the map information and the position of the vehicle 10 indicated by the series of positioning information obtained in the latest predetermined period, and determines whether or not the vehicle 10 is traveling in the snow melting pipe section, and whether or not the distance until the vehicle exits the snow melting pipe section is less than a predetermined distance. Then, when the vehicle 10 is traveling in the snow melting pipe section or exits the snow melting pipe section, the vehicle control unit 33 executes a safety travel control for the vehicle 10 that has a higher degree of safety than the travel control executed before the vehicle enters the snow melting pipe section.

Specifically, when the vehicle 10 is traveling in the snow melting pipe section, the vehicle control unit 33 controls each unit of the vehicle 10 so that the vehicle 10 travels at a position farther than the snow melting pipe by a predetermined offset distance or more. Further, the vehicle control unit 33 may control each unit of the vehicle 10 so that, in the lateral direction orthogonal to the traveling direction of the vehicle 10, a distance from the bicycle or another vehicle to the vehicle 10 (hereinafter, referred to as a lateral distance) when the vehicle 10 is traveling in the snow melting pipe section is larger than a lateral distance when the vehicle 10 is traveling in a section other than the snow melting pipe section. Further, the vehicle control unit 33 may set the target speed when the vehicle 10 is traveling in the snow melting pipe section or when the distance from the snow melting pipe section to exit is less than the predetermined distance to a speed lower than the speed limit of the snow melting pipe section by a predetermined speed, and control each unit of the vehicle 10 so that the speed of the vehicle 10 becomes the target speed. Furthermore, the vehicle control unit 33 may switch the applied driving mode from the autonomous driving mode to the manual driving mode, or alert the driver of the slip via the notification device in the vehicle interior, when the vehicle 10 enters the snow melting pipe section or the distance until the vehicle 10 exits the snow melting pipe section becomes less than a predetermined distance.

The computer program that achieves the functions of the processor 23 of the ECU 5 according to the above-described embodiment or modification may be provided in a form recorded on a computer-readable portable recording medium such as a semiconductor memory, a magnetic recording medium, or an optical recording medium.

As described above, a skilled person can make various modifications according to the embodiment within the scope of the present invention.

What is claimed is:

1. A vehicle control device comprising:

a memory configured to store structure information indicating a position and type of a structural object visible from a vehicle traveling in a predetermined road section, feature information indicating a position and number of one or more predetermined features which are provided in the predetermined road section and represent information relating to a traveling of the vehicle or affects the traveling of the vehicle, and similar relationship information indicating a similar relationship between the one or more predetermined features and the structural object; and a processor configured to:

detect the one or more predetermined features based on an image which is generated by a camera mounted on the vehicle and represents a situation around the vehicle, determine whether or not the structural object has been erroneously recognized as at least one of the one or more predetermined features detected while the vehicle is traveling in the predetermined road section, based on the structure information, the feature information and the similarity relationship information, and control the traveling of the vehicle according to whether or not the structural object has been erroneously recognized as the at least one of the one or more detected predetermined features, wherein the structural object is a snow melting pipe, and the one or more predetermined features are a lane division line, wherein the memory further stores map information representing a positional relationship between the snow melting pipe and the lane division line, and wherein the processor controls the traveling of the vehicle so as to maintain a predetermined positional relationship with respect to the lane division line based on the positional relationship between the snow melting pipe and the lane division line represented in the map information and the relative position of the snow melting pipe erroneously recognized as the lane division line with respect to the vehicle, when the snow melting pipe has been erroneously recognized as any of the one or more predetermined features detected in the predetermined road section.

2. The vehicle control device according to claim 1, wherein the processor determines that the structural object has been erroneously recognized as the at least one of the one or more detected predetermined features when a number of the one or more predetermined features detected in the predetermined road section is larger than a number of the one or more predetermined features represented in the feature information, or when a position of any of the one or more detected predetermined features is closer to the position of the structural object which is similar to the one or more predetermined features indicated in the similar relationship information than a position of a corresponding feature indicated in the feature information, the position of the structural object being indicated in the structure information.

* * * * *